(12) United States Patent
Bae et al.

(10) Patent No.: US 7,821,378 B2
(45) Date of Patent: Oct. 26, 2010

(54) APPARATUS AND METHOD FOR RECEIVING TAG SIGNAL IN MOBILE RFID READER

(75) Inventors: Ji-Hoon Bae, Daejon (KR); Chan-Won Park, Daejon (KR); Hee-Sook Mo, Daejon (KR); Dong-Han Lee, Daejon (KR); Chenghao Quan, Jilin Province (CN); Gil-Young Choi, Daejon (KR); Cheol-Sig Pyo, Daejon (KR); Jong-Suk Chae, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 1064 days.

(21) Appl. No.: 11/527,998

(22) Filed: Sep. 27, 2006

(65) Prior Publication Data

US 2007/0069864 A1 Mar. 29, 2007

(30) Foreign Application Priority Data

Sep. 29, 2005 (KR) ............. 10-2005-0091605
May 11, 2006 (KR) ............. 10-2006-0042575

(51) Int. Cl.
*H04Q 5/22* (2006.01)
(52) U.S. Cl. ............. 340/10.2; 340/10.3; 340/10.5
(58) Field of Classification Search ............. 340/10.3, 340/10.5, 825.72; 455/108; 329/300
See application file for complete search history.

(56) References Cited

U.S. PATENT DOCUMENTS 6,765,959 B1* 7/2004 Tanaka et al. ............. 375/239
2004/0203478 A1 10/2004 Scott

FOREIGN PATENT DOCUMENTS

JP 10209912 8/1998
KR 1020050041950 5/2005

* cited by examiner

*Primary Examiner*—Vernal U Brown
(74) *Attorney, Agent, or Firm*—Ladas & Parry LLP

(57) ABSTRACT

Provided are a tag signal receiving apparatus that can perform digital Amplitude Shift Keying (ASK) demodulation onto signals received in a tag, decode the demodulated tag signal in synchronization, and acquire tag data in a mobile RFID reader, and a method thereof. The tag signal receiving apparatus includes: a digital demodulating block for performing ASK demodulation onto a digital tag signal received through a reader antenna and converted into a digital tag signal in an analog-to-digital (AD) converter; and a decoding block for detecting edge position information of the demodulated tag signal by performing accumulation and decoding the demodulated tag signal by using the detected edge position information. The digital demodulating block includes a channel level comparator, a phase inverter, a signal converter; and an adder. The decoding block includes an edge information detector, a correlator, and a bit data decider.

38 Claims, 5 Drawing Sheets

APPARATUS AND METHOD FOR RECEIVING TAG SIGNAL IN MOBILE RFID READER

FIELD OF THE INVENTION

The present invention relates to a tag signal receiving apparatus of a mobile Radio Frequency Identification (RFID) reader, and a method thereof; and, more particularly, to a tag signal receiving apparatus that can perform digital Amplitude Shift Keying (ASK) demodulation onto signals received in a tag, decode the demodulated tag signal in synchronization, and acquire tag data in a mobile RFID reader, and a method thereof.

DESCRIPTION OF RELATED ART

Generally, Radio Frequency Identification (RFID) is a technology for recognizing, tracing, and managing human beings, animals, and/or objects with a tag attached thereto by writing or reading information in or out of a tag having its own identification information without a contact. An RFID system includes a plurality of electronic tags, or transponder, which will be simply referred to as tags hereinafter, and an RFID reader. Each tag has identification information and it is attached to an object or an animal, and the RFID reader writes or reads information in or out of the tags. RFID systems are divided into a mutual induction type and an electromagnetic wave type according to the communication method between the RFID reader and the tags. The RFID systems are also divided into an active type and a passive type according to whether the tags are operated with their own power source. They are also divided into a long wavelength RFID reader, an intermediate wavelength RFID reader, a short wavelength RFID reader, an ultra short wavelength RFID reader, and a microwave RFID reader. Diverse specifications are defined or under definition according to the above classification.

Meanwhile, a Ubiquitous Sensor Network (USN) connects and manages RFID tags in all places where data need to be collected in real-time and collects not only recognition information of objects having the tags attached thereto but also environmental information of the tags. Ultimately, the ubiquitous sensor network realizes a communication environment any time any place by giving computing and communication functions to all objects, regardless of the kinds of networks, devices, and services.

As for the frequency band of the RFID/USN wireless equipment, it is expected that an Ultra-High Frequency (UHF) ranging from 860 to 960 MHz could be used widely. Passive RFID/USN wireless equipment used in Korea is defined to perform access in a channel bandwidth of 200 kHz in the range of 908.5 to 914 MHz by using a Frequency Hopping Spread Spectrum (FHSS) or Listen Before Talk (LBT) frequency occupying method.

Meanwhile, Pulse Interval Encoding (PIE) is used as the encoding method of the RFID reader, and as for modulation, Double-SideBand Amplitude-Shift Keying (DSB-ASK), Single-SideBand Amplitude-Shift Keying (SSB-ASK), or Phase-Reversal Amplitude-Shift Keying (PR-ASK) is used. On the part of the tags, a FM0 (bi-phase space encoding) method or a Miller Sub-carrier method is used to encode data in the tags and ASK or Phase Shift Keying (PSK) is used for modulation in the tags.

There is an attempt to connect the RFID system composed of RFID readers and tags to a commercial mobile communication network to promote the use of RFID technology in more diverse fields and activate the RFID system. To connect the RFID system with the commercial mobile communication network, an RFID reader that can be built in a mobile terminal or connected to the mobile terminal as an additional device is required. However, no technology has provided a core function of the RFID reader used in the UHF band in the form of a single chip, which will be simply referred to as an MRF (Mobile RFID) SoC, and this remains as an obstacle to practical use of the RFID technology.

SUMMARY OF THE INVENTION

It is, therefore, an object of the present invention to provide a tag signal receiving apparatus for a mobile Radio Frequency Identification (RFID) reader that can perform digital Amplitude-Shift Keying (ASK) demodulation onto signals transmitted from a tag, decode the demodulated tag signals in synchronization, and acquire tag data in an MRF SoC for performing the function of the RFID reader mounted on a mobile device such as a wireless communication terminal, and a method thereof. Particularly, the object of the present invention is to realize a digital tag signal receiving apparatus that can be easily mounted on the MRF SoC operated in the UHF band.

In accordance with an aspect of the present invention, there is provided a tag signal receiving apparatus for an RFID reader, which includes: a digital demodulating block for performing ASK demodulation onto a digital tag signal received through a reader antenna and converted into a digital tag signal in an analog-to-digital (AD) converter; and a decoding block for detecting edge position information of the demodulated tag signal by performing accumulation and decoding the demodulated tag signal by using the detected edge position information.

The digital demodulating block includes: a channel level comparator for comparing signal levels of the I and Q channel signals outputted from the AD converter; a phase inverter for inverting a phase of a channel tag signal having a smaller signal level between the I channel tag signal and the Q channel tag signal based on the comparison result; a signal converter for squaring positive data of the phase-inverted tag signal and the channel tag signal having a larger signal level, and squaring negative data and converting the squared value into a negative number; and an adder for summating the I channel tag signal and the Q channel tag signal which are outputted from the signal converter.

The decoding block includes: an edge information detector for detecting edge position information of the demodulated signal; a correlator for performing correlation onto the demodulated signal based on the detected edge position information; and a bit data decider for determining bit data based on the correlation result.

The correlator decides a position where correlation is to be performed for the demodulated tag signal based on the edge position information. The edge information detector detects edge information of the demodulated tag signal based on a first peak position where an absolute value of a value obtained from a first accumulation for one symbol duration is a maximum and a second peak position where an absolute value of a value obtained from a second accumulation performed a half duration behind the first accumulation is a maximum for one symbol duration. The edge information detector includes: a first peak detecting unit for detecting the first peak position; a second peak detecting unit for detecting the second peak position; and an edge position registering unit for deciding and storing edge position information for the demodulated signal, when a difference between the first peak position and the second peak position is within a tolerable range.

The decoding block further includes a tag effective signal generator for generating a tag effective signal, when the number of edge position information stored in the edge position registering unit is larger than a predetermined number. The correlator decides whether to perform correlation based on the tag effective signal. The decoding block further includes a preamble detector for detecting a preamble from bit data decided in the bit data decider. The preamble detector detects an FM0 preamble or a Miller-modulated sub-carrier preamble.

In accordance with another aspect of the present invention, there is provided a tag signal receiving method for an RFID reader, which includes the steps of: a) converting a tag signal received through a reader antenna into a digital tag signal; b) performing digital ASK demodulation onto the digital tag signal; c) detecting edge position information of the demodulated tag signal; d) decoding the demodulated tag signal based on the detected edge position information; and e) detecting a preamble from the decoded tag data. The demodulation step b) includes the steps of: b1) measuring and comparing Received Signal Strength Indication (RSSI) of the I channel tag signal and the Q channel tag signal with each other; b2) inverting a phase of a channel tag signal having a smaller RSSI; b3) performing Square Root (SQR) signal conversion onto the phase-inverted channel tag signal and a channel tag signal having a larger RSSI by squaring positive data and squaring negative data and converting the squared negative data into a negative number; and b4) summating the SQR-converted I channel tag signal and the SQR-converted Q channel tag signal.

The edge position information detection step c) includes the steps of: c1) detecting a first peak position from a first accumulation performed onto the demodulated tag signal for one symbol duration; c2) detecting a second peak position from a second accumulation performed a half symbol duration behind the first accumulation for one symbol duration; and c3) detecting and storing edge position information based on the first peak position and the second peak position.

The decoding step d) includes the steps of: d1) performing correlation onto the demodulated tag signal based on the detected edge position information; and d2) deciding bit data based on correlation result. A position where the correlation is to be performed onto the demodulated tag signal is decided based on the edge position information in the correlation step d1). The correlation is performed based on a FM0 (bi-phase space encoding) symbol or a Miller-modulated sub-carrier symbol in the correlation step d1). When a preamble is not detected in the preamble detection step e), the decoding of the demodulated tag signal is suspended.

In accordance with another aspect of the present invention, there is provided an RFID reader mounted on a wireless communication terminal, which includes: a digital demodulating block for performing Amplitude Shift Keying (ASK) demodulation onto a digital tag signal received through a reader antenna and converted into a digital tag signal in an analog-to-digital (AD) converter; a decoding block for detecting edge position information of the demodulated signal and decoding the demodulated signal based on the detected edge position information; and a reader control unit for acquiring tag data from the decoded tag signal and transferring the tag data to the wireless communication terminal. The digital demodulating block includes a Received Signal Strength Indication (RSSI) filtering unit for measuring RSSI of an In-phase (I) channel tag signal and a Quadrature (Q) channel tag signal which are outputted from the AD converter.

The digital demodulating block further includes an LBT controller for deciding a channel to be used for communication with a tag by using the RSSI measured in the RSSI filtering unit.

The digital demodulating block includes: a phase inverter for inverting a phase of a channel tag signal having a smaller signal level between the I channel tag signal and the Q channel tag signal based on the measurement result in the RSSI filtering unit; an Square Root (SQR) signal converter for performing SQR signal conversion onto the phase-inverted channel tag signal and a channel tag signal having a larger signal level than the phase-inverted channel tag signal; and an adder for summating the SQR-converted I channel tag signal and the SQR-converted Q channel tag signal.

Also, the decoding block includes: an edge information detector for detecting edge position information of the demodulated signal; a correlator for performing correlation onto the demodulated signal based on the detected edge position information; and a bit data decider for deciding bit data based on the correlation result.

The decoding block further includes: a tag effective signal generator for generating a tag effective signal, when the number of edge position information detected in the edge information detector is larger than a predetermined number; and a preamble detector for detecting a preamble from bit data decided in the bit data decider.

The edge information detector further includes: a first peak detecting unit for detecting a first peak position based on a first accumulation performed onto the demodulated tag signal for one symbol duration; a second peak detecting unit for detecting a second peak position based on a second accumulation performed a half duration behind the first accumulation; and an edge position registering unit for deciding and storing edge position information for the demodulated signal, when a difference between the first peak position and the second peak position is within a tolerable range.

The correlator decides a position where correlation is to be performed onto the demodulated tag signal based on the edge position information. Herein, the correlator decides whether to perform the correlation based on the tag effective signal.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter. When it is determined that detailed description on related art in the description of the present invention may obscure the points of the present invention, the description will not be provided herein. Hereinafter, embodiments of the present invention will be described with reference to the accompanying drawings.

Figure 1:
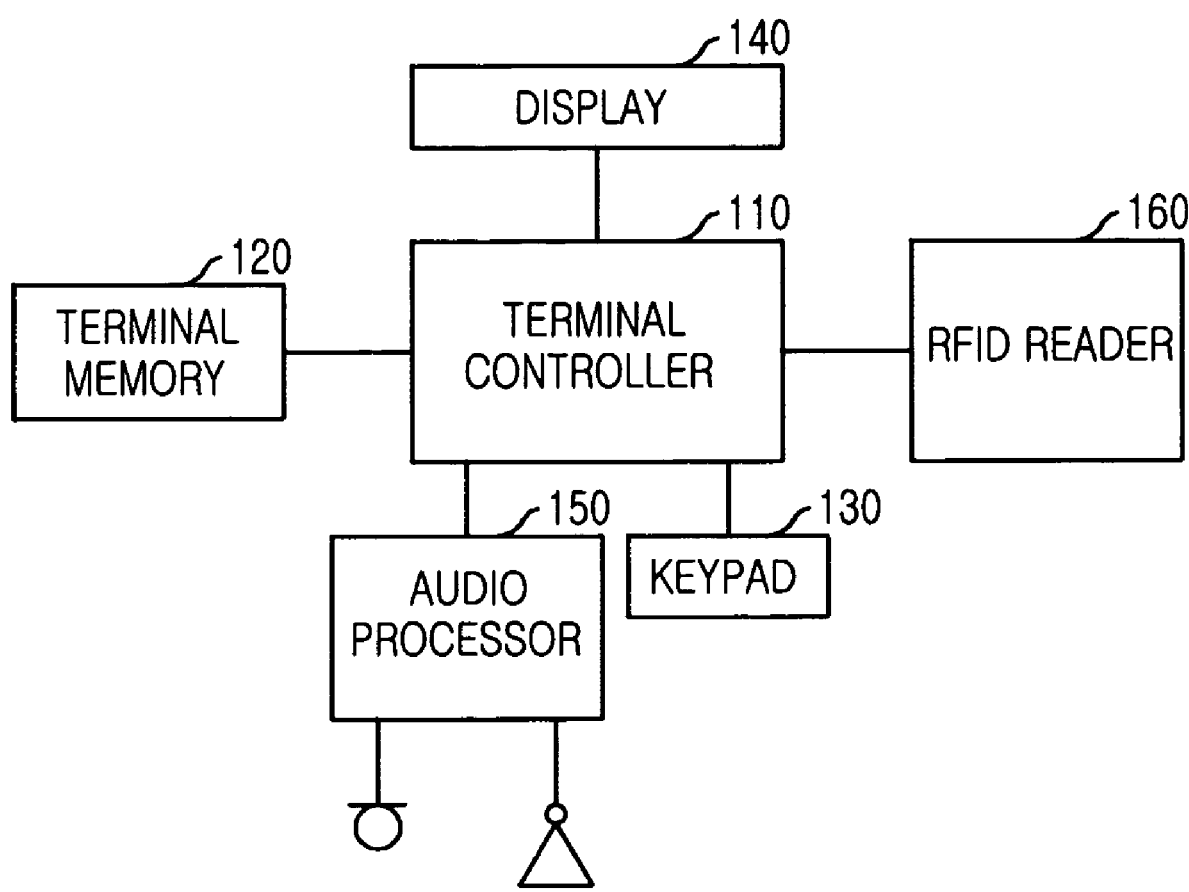
FIG. 1 is a block diagram showing a wireless communication terminal equipped with a Radio Frequency Identification (RFID) reader in accordance with an embodiment of the present invention.

FIG. 1 is a block diagram showing a wireless communication terminal equipped with a Radio Frequency Identification (RFID) reader in accordance with an embodiment of the present invention.

Referring to FIG. 1, a terminal memory 120 may be composed of a program memory and a data memory. The program memory stores programs for controlling general call operation of the wireless communication terminal and programs for executing a mobile RFID service and displaying the result on a display unit. The data memory temporarily stores data generated in the middle of executing the programs. The audio processor 150 recovers audio signals outputted from a terminal controller or transmits audio signals generated in a microphone to the terminal controller. A keypad 130 includes keys for inputting number or text data and function keys for setting up diverse functions. It may also include function keys for inputting a wait command for preparing a mobile RFID reader for operation or a read command for commanding the mobile RFID reader to read tag information in accordance with an embodiment of the present invention. Meanwhile, the display 140 shows an operation result of the mobile RFID service, and the display 140 may be a liquid crystal display (LCD).

The terminal controller 110 controls the general operation of the wireless communication terminal, transfers the wait command for preparing the mobile RFID reader 160 for operation or the read command for executing communication with a tag to the mobile RFID reader 160, which will be simply referred to as an RFID reader hereinafter, and receives tag information including electronical product code (EPC) which is acquired from the communication with the tag in the RFID reader 160.

The RFID reader 160 receives the wait command or the read command for beginning communication with the tag from the terminal controller 110. Upon receipt of the read command, the RFID reader 160 occupies an UHF band frequency in a Listen Before Talk (LBT) or Frequency Hopping Spread Spectrum (FHSS) method, performs reader-to-tag communication based on an RFID protocol, and transmits the tag information, i.e., EPC, acquired from the communication with the tag to the terminal controller 110.

Figure 2:
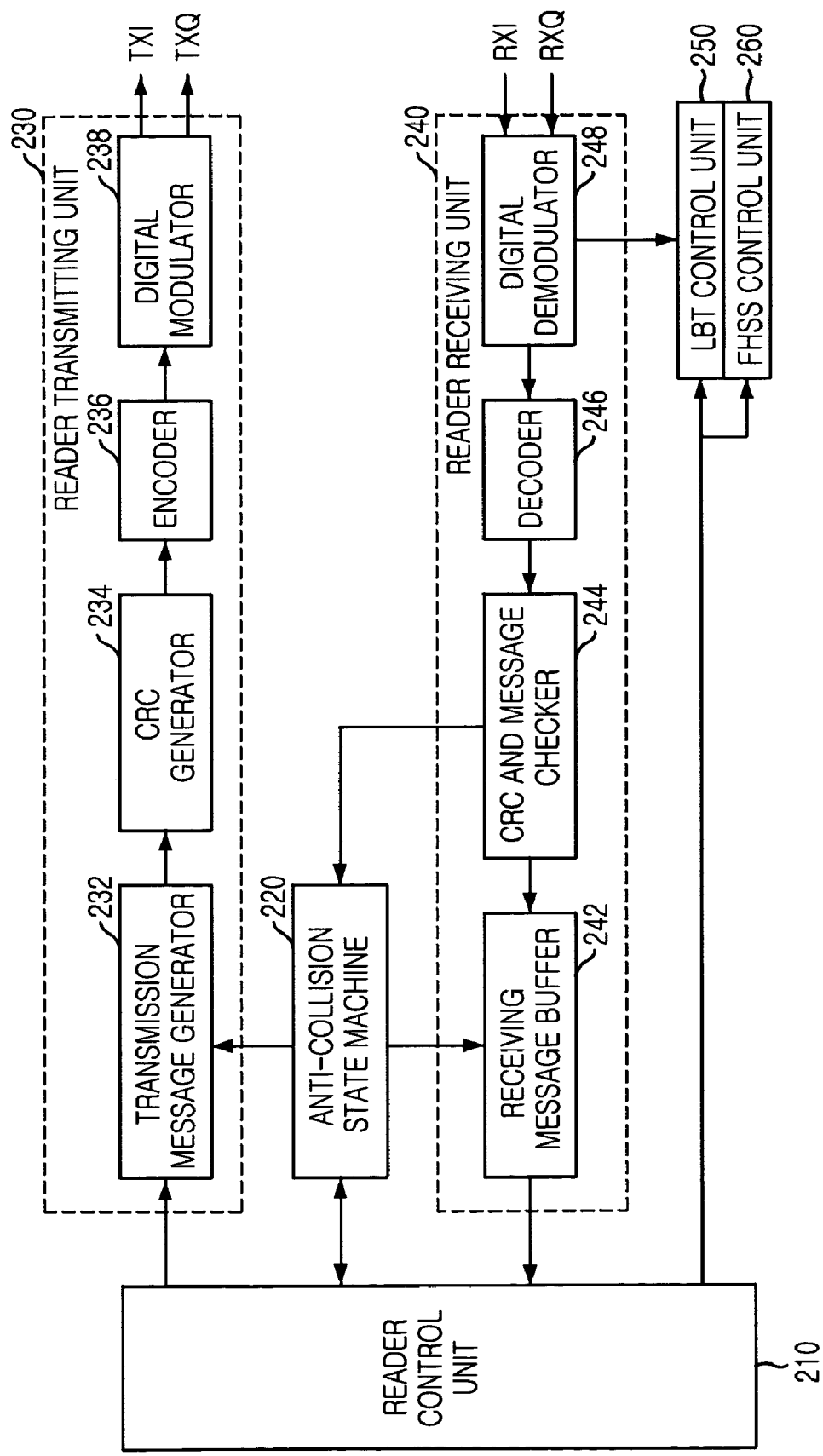
FIG. 2 is a block diagram illustrating a mobile RFID reader equipped with a tag signal receiving apparatus in accordance with an embodiment of the present invention.

FIG. 2 is a block diagram illustrating a mobile RFID reader equipped with a tag signal receiving apparatus in accordance with an embodiment of the present invention. The RFID reader of the present embodiment communicates with a passive RFID tag in the UHF band. Hereinafter, an example where the RFID reader of the present invention is operated based on the ISO/IEC 18000-6C International Standard Specification, which is an RFID protocol specification in the UHF band ranging from 860 MHz to 960 MHz.

As shown in FIG. 2, the RFID reader includes a reader control unit 210, a reader transmitting unit 230, a reader receiving unit 240, an anti-collision state machine 220, an LBT control unit 250, and an FHSS control unit 260. The reader control unit 210 receives commands for operating the RFID reader from the terminal controller. The reader transmitting unit 230 transmits reader command data in reader-to-tag communication. The reader receiving unit 240 receives data from a tag in the communication with the tag. The anti-collision state machine 220 controls collision among a plurality of tags in the communication with the tag. The LBT control unit 250 performs LBT control, and the FHSS control unit 260 performs frequency hopping spread spectrum.

The reader control unit 210 controls diverse registers n the RFID reader, and address pins used for the control of the registers are defined according to the number of the registers to be used. Also, the reader control unit 210 may use a chip select signal, a read signal, a write signal, and an output enable signal to control the registers. Meanwhile, the reader control unit 210 controls the blocks shown in FIG. 2, and uses a synchronous interface for Central Processing Unit (CPU) clock among the blocks. According to the present invention, the reader control unit 210 can determine whether to use the LBT method or the FHSS method to communicate with the tag, set an LBT variable needed for the determination in the LBT control unit 250, or sets an FHSS variable in the FHSS control unit 260. Also, the reader control unit 210 sets reader commands needed for the communication with the tag in a transmission message generator 232, and receives tag information including EPC acquired from the communication with the tag from a receiving message buffer 242.

The reader transmitting unit 230 includes a transmission message generator 232, a Cyclic Redundancy Check (CRC) generator 234, an encoder 236, and a digital modulator 238.

The transmission message generator 232 generates command messages to be transmitted to the tag upon receipt of a command from the anti-collision state machine 220. The generated messages include commands used in the process of 'Inventory' such as 'Query,' 'QueryAdjust,' 'QueryRep,' and 'Ack,' and commands used in the process of 'Access' such as 'Req_RN,' 'Read,' and 'Write.' The CRC generator 234 generates CRC for frames of the above-generated transmission message and adds the CRC to the transmission message. The generation and addition of the CRC may be carried out in the transmission message generator 232.

The encoder 236 encodes message data transmitted through the transmission message generator 232 and the CRC generator 234. According to the International Standard ISO/IEC 18000-6C Specification, the encoder 236 performs Pulse-Internal Encoding (PIE). Also, the digital modulator 238 receives the encoded data from the encoder 236 and generates and shapes a wavelength form for DSB-ASK or PR-ASK. The digital modulator 238 may include a Root Raised Cosine (RRC) filter for shaping the wavelength form of the encoded data properly to the International Standard ISO/IEC 18000-6C. In this case, the RRC filter limits unnecessary band in the RF terminal, removes interference among symbols, and shapes a normalized envelope for communication with the tag. The signals outputted from the digital modulator 238 are inputted to a Digital-to-Analog Converter (not shown) to be converted into analog signals. The analog signals are up-converted into the UHF band, amplified, and then transmitted to the tag through a reader antenna.

Meanwhile, the reader receiving unit 240 includes a digital demodulator 248, a decoder 246, a CRC and message checker 244, and a receiving message buffer 242.

The digital demodulator 248 of the present invention receives the analog signals through a reader antenna, down-converts the analog signals, converts them into digital signals, which include In-phase (I) signals and Quadrature (Q) signals, in an analog-to-digital (AD) converter (not shown), and performs ASK demodulation onto the I and Q signals. The operation of the digital demodulator 248 will be described hereinafter with reference to FIGS. 3 and 4.

The decoder 246 of the present invention performs FM0 (bi-phase space encoding) or Miller Sub-carrier decoding by detecting edge information from the ASK demodulated signal transmitted from the digital demodulator and performing signal correlation onto synchronized tag signals based on the edge information. Also, the decoder 246 detects a preamble from the decoded tag data. The operation of the decoder 246 will be described in detail with reference to FIGS. 3, 5 and 6.

The CRC and message checker 244 checks whether there is an error in the CRC by calculating the CRC of the tag data transmitted from the decoder, checks a tag information message, and reports a tag response state and whether there is an error in the CRC to the anti-collision state machine 220.

The receiving message buffer 242 buffers the receiving message data transmitted from the CRC and message checker. It also transmits the buffered tag data, e.g., EPC or user specific data, to the reader control unit 210 upon receipt of a command from the anti-collision state machine 220.

The anti-collision state machine 220 controls the operation of the RFID reader for the reader-to-tag communication upon receipt of a command from the reader control unit 210. To be specific, when the anti-collision state machine 220 receives a command for starting communication with the tag from the reader control unit 210, it controls the transmission message generator 232 to generate a reader command. Also, the anti-collision state machine 220 reports tag information reception state, which is transmitted from the CRC and message checker 244, to the reader control unit 210, and determines a reader command to be transmitted to the tag based on the tag information state reported by the CRC and message checker 244. Also, when the reader receiving unit 240 has successfully acquired tag information including EPC, it controls the receiving message buffer 242 to transmit the acquired tag information, which includes EPC or user-specific data, to the reader control unit 210.

Meanwhile, the anti-collision state machine 220 prevents collision between tags in the reader-to-tag communication. Anti-collision means a process that the RFID reader identifies one tag among a plurality of tags and acquires tag information of the tag. Reader commands used in the anti-collision process include 'Select,' 'Query,' and 'QueryRep'.

The LBT control unit 250 receives a variable for executing LBT from the reader control unit 210 and executes the LBT. To be specific, the LBT control unit 250 generates a frequency channel index sequence to search for a channel to be used in communication with the tag, and receives a Received Signal Strength Indication (RSSI) selected based on the generated channel index sequence from the digital demodulator 248. Then, the LBT control unit 250 determines whether there is an empty channel by comparing the received RSSI with a predetermined threshold value, determines a channel to be used for the communication with the tag, and transmits the result to the reader control unit 210 or the anti-collision state machine 220 to thereby start communication with the tag.

Meanwhile, the FHSS control unit 260 receives the variable for executing FHSS from the reader control unit 210 and executes FHSS. To be specific, the FHSS control unit 260 generates a frequency channel index sequence, occupies a channel based on the generated channel index sequence, and starts communication with the tag.

Finally, the RFID reader of the present invention additionally includes a clock generator (not shown) for supplying diverse clock signals to be used in the RFID reader. The clock generator generates and provides clocks and control signals to be used in the RFID reader. Since the clock generator has a timer for operating the reader control unit 210 in real-time, it can reduce the load applied to the reader control unit.

Figure 3:
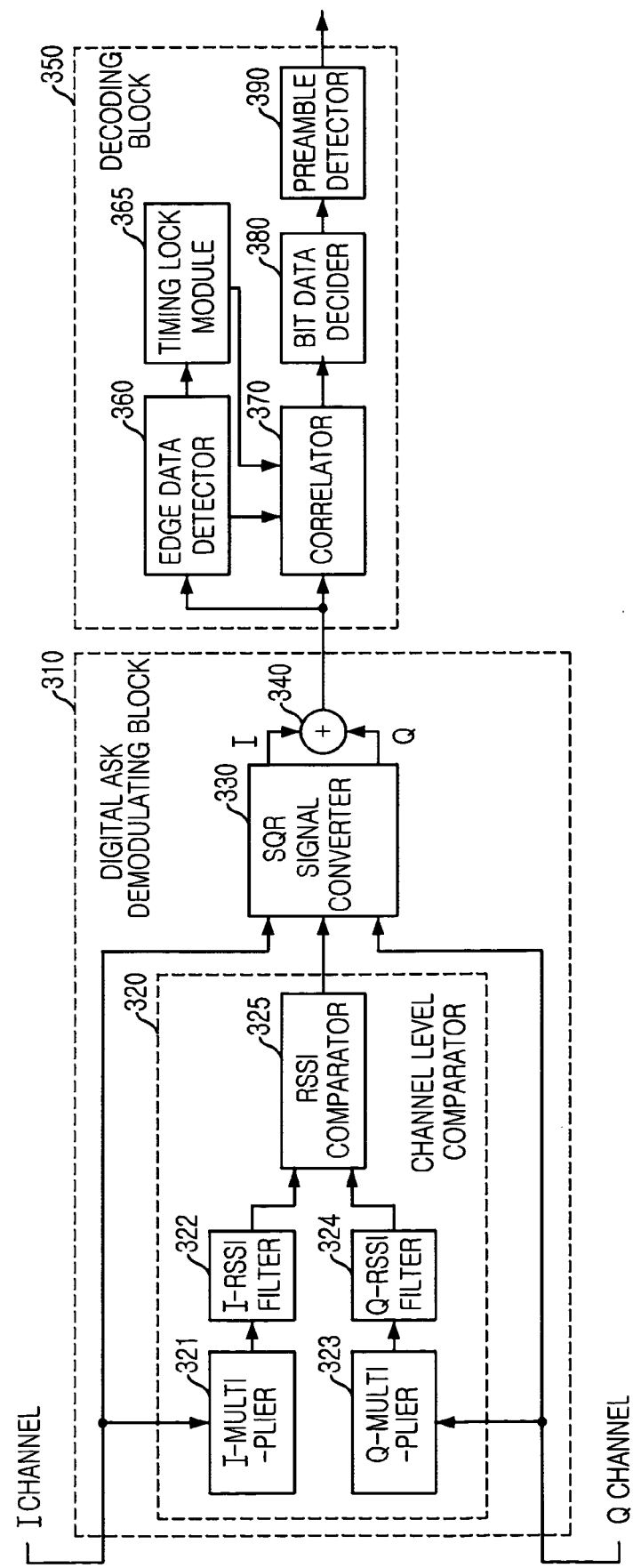
FIG. 3 is a block diagram describing the tag signal receiving apparatus of the mobile RFID reader in accordance with an embodiment of the present invention.

FIG. 3 is a block diagram describing the tag signal receiving apparatus of the mobile RFID reader in accordance with an embodiment of the present invention. As shown in FIG. 3, the tag signal receiving apparatus of the RFID reader includes a digital ASK demodulating block 310 and a decoding block 350. The digital ASK demodulating block 310 receives I channel signals and Q channel signals, which are digital signals obtained from the AD converter, and performs digital ASK demodulation. The decoding block 350 receives and decodes the demodulated tag signals. Herein, the digital ASK demodulating block 310 corresponds to the digital demodulator 248 of FIG. 2, and the decoding block 350 corresponds to the decoder 246 of FIG. 2.

The digital ASK demodulating block 310 detects an amplitude of the tag signals through the digital ASK demodulation to be easily mounted on the mobile RFID reader SoC. The digital ASK demodulating block 310 includes a channel level comparator 320, a Square Root (SQR) signal converter 330, and an adder 340. The channel level comparator 320 compares signal levels of the inputted I and Q channel signals with each other. The SQR signal converter 330 detects the amplitude of the tag signals based on the comparison result. The adder 340 summates the I channel signals and the Q channel signals, which are outputted from the SQR signal converter 330.

The channel level comparator 320 includes an I channel multiplying unit 321, an I channel RSSI filtering unit 322, a Q channel multiplying unit 323, and a Q channel RSSI filtering unit 324, and an RSSI comparing unit 325. The I channel multiplying unit 321 squares an I channel tag signal transmitted from the AD converter, and the I channel RSSI filtering unit 322 measures the RSSI of the squared I channel signal. The Q channel multiplying unit 323 squares a Q channel tag signal transmitted from the AD converter, and the Q channel RSSI filtering unit 324 measures the RSSI of the squared Q channel signal. The RSSI comparing unit 325 compares the RSSI values measured in the I and Q RSSI filtering units 322 and 324 and transmits the comparison result to the SQR signal converter 330.

The SQR signal converter 330 receives the I channel tag signal and the Q channel tag signal from the AD converter and receives the channel level comparison result from the channel level comparator 320, and performs an SQR signal conversion based on a channel signal having the larger RSSI. The SQR signal converter 330 is equipped with a phase inverter for inverting the phase of a channel signal having a smaller RSSI value to thereby make the phase the same as the phase of the channel signal having the larger RSSI value.

Figure 4:
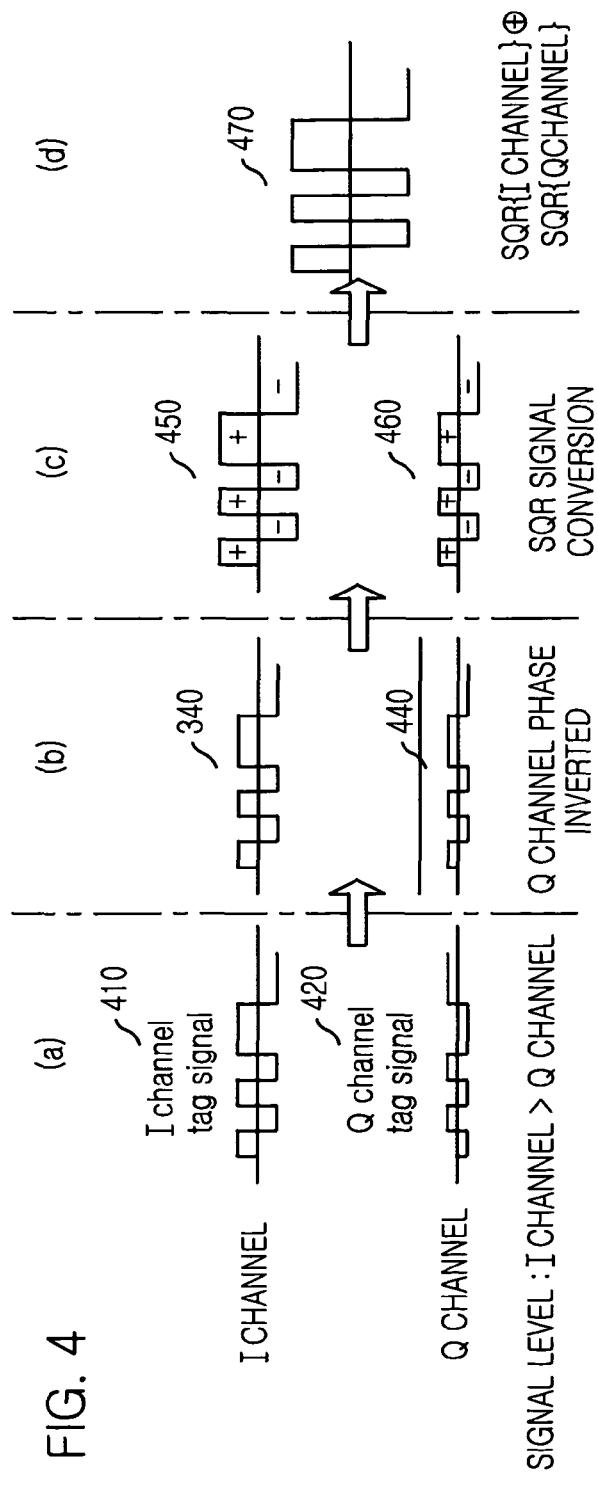
FIG. 4 is a view describing the operation of a digital Amplitude-Shift Keying (ASK) demodulating block in accordance with an embodiment of the present invention.

FIG. 4 is a view describing the operation of a digital ASK demodulating block 310 in accordance with an embodiment of the present invention. Hereinafter, the operation of the digital ASK demodulating block 310 will be described in detail with reference to an example where the signal level of the I channel tag signal is larger than the signal level of the Q channel tag signal.

Tag signals are received in the reader antenna and down-converted. The down-converted tag signals are converted into digital signals including I channel tag signals and Q channel signals in the AD converter and inputted to a digital ASK demodulating block 310. The digital ASK demodulating block 310 compares the signal level of the digital I channel tag signal with the signal level of the digital Q channel tag signal by using the channel level comparator 320. To be specific, the I channel multiplying unit 321 squares the I channel tag signal inputted from the AD converter and transmits the square value to the I channel RSSI filtering unit 322. The I channel RSSI filtering unit 322 measures the RSSI of the squared I channel signal sample data and transmits the measured RSSI to the RSSI comparing unit 325. Likewise, the Q channel multiplying unit 323 squares the Q channel tag signal inputted from the AD converter. Then, the Q channel RSSI filtering unit 324 measures the RSSI of the squared Q channel signal sample data and transmits the measured RSSI to the RSSI comparing unit 325. The RSSI comparing unit 325 compares the RSSI of the I channel tag signal with the RSSI of the Q channel tag signal and transmits the comparison result to the SQR signal converter 330.

The SQR signal converter 330 receives the digital I channel tag signal 410 and the Q channel tag signal 420, which are acquired in the AD converter, and inverts the phase of a channel tag signal having a smaller signal level, i.e., smaller RSSI, to become the same as the phase of a channel tag signal having a larger RSSI based on the signal level comparison result transmitted from the RSSI comparing unit 325. In FIG. 4, since the signal level of the Q channel tag signal is lower than that of the I channel tag signal in a section (a), the Q channel tag signal is inverted at 180° by using a phase inverter to have a signal level of a section (b).

Subsequently, the SQR signal converter 330 performs SQR signal conversion onto the I channel tag signal and the 180°-inverted Q channel tag signal, which is shown in a section (c) of FIG. 4. To be specific, the SQR signal conversion is performed onto each channel tag signal which is a two's compliment data format. When the data are negative data, the SQR signal conversion is performed by squaring negative data and converting the square value into a negative number. When the data are positive data, the SQR signal conversion is performed by squaring the positive data.

The SQR-converted I channel tag signal and the SQR-converted are summated in the adder 340 and transmitted to the decoding block 350. The digital ASK demodulating block 310 can correct amplitude variation of the backscattered tag signal caused by a phase change according to a reading range by summating the SQR-converted signals of the two channels.

Meanwhile, the decoding block 350 detects edge information from the ASK-demodulated tag signals from the digital ASK demodulating block 310. Also, the decoding block 350 performs signal correlation onto the ASK-demodulated tag signals based on the edge information, and determines bit data to thereby complete FM0 (bi-phase space encoding) or Miller sub-carrier decoding. In addition, the decoding block 350 may detect a preamble from the decoded tag data.

The decoding block 350 for decoding the tag signal obtained from demodulation in the digital ASK demodulating block 310 includes an edge information detector 360, a correlator 370, a bit data decider 380, and a preamble detector 390. Also, the decoding block 350 may additionally include a timing lock module 365. The edge information detector 360 detects edge information of an inputted tag signal. The correlator 370 performs correlation onto a tag signal demodulated in the digital ASK demodulating block 310. The bit data decider 380 decides bit data based on the correlation result. The preamble detector 390 reads the decided bit data and detects a preamble. The timing lock module 365 generates a tag effective signal based on the edge information detected in the edge information detector 360.

The edge information detector 360 receives sampling data of the ASK-demodulated tag signal from the digital ASK demodulating block 310, detects edge information, and stores the edge information in a edge position registering unit 550.

Figure 5:
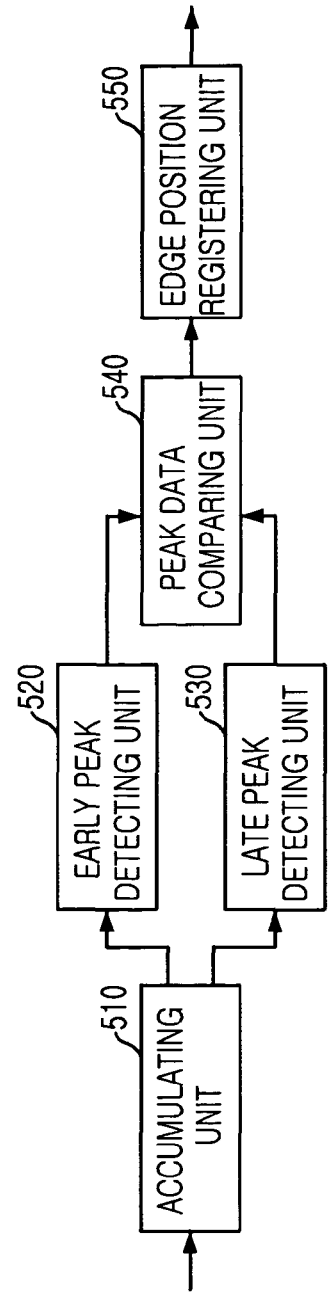
FIG. 5 is a block diagram illustrating an edge information detector in accordance with an embodiment of the present invention.

As shown in FIG. 5, the edge information detector 360 includes an accumulating unit 510, an early peak detecting unit 520, a late peak detecting unit 530, a peak data comparing unit 540, and an edge position registering unit 550.

Figure 6:
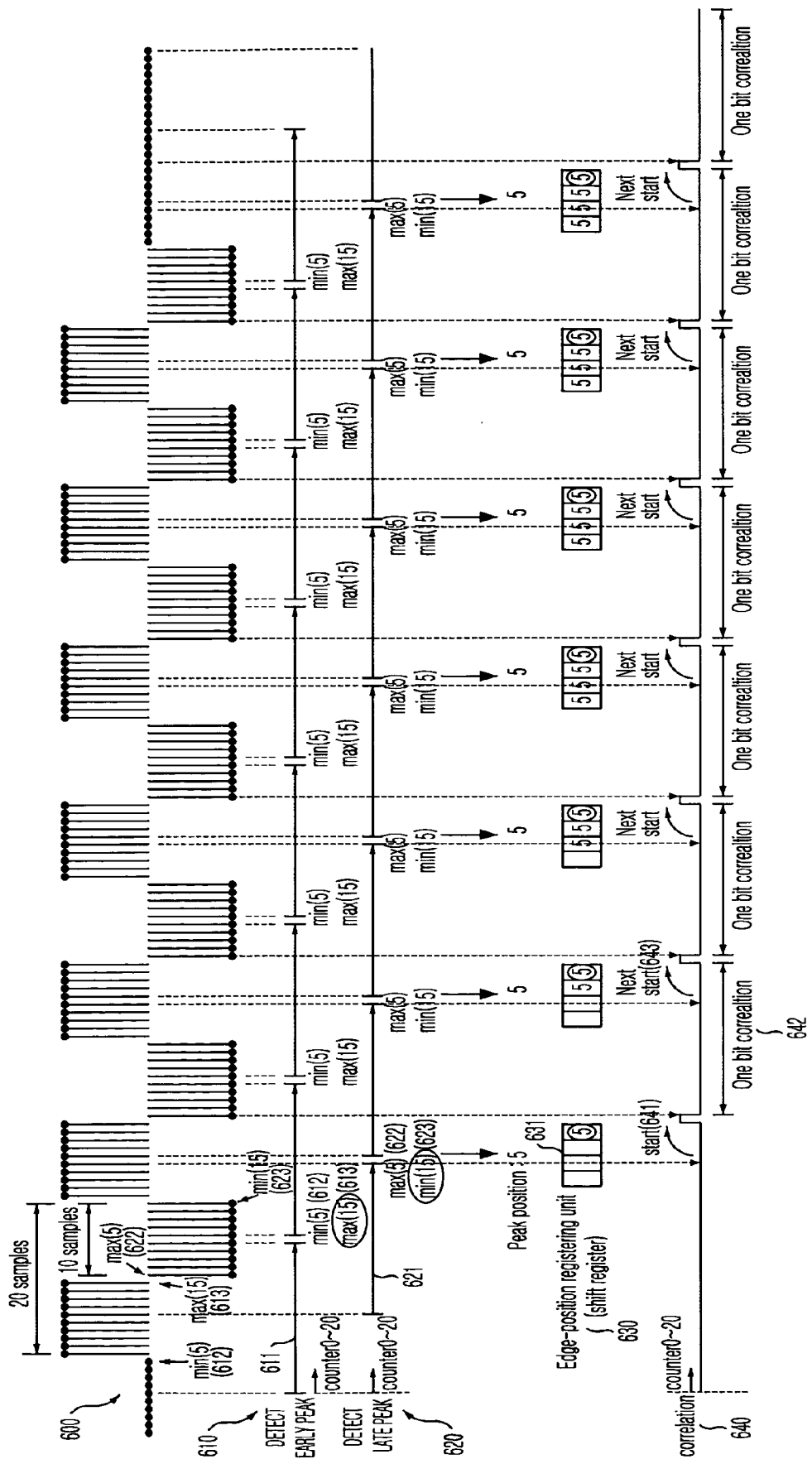
FIG. 6 is a view describing the operation of a decoding block in accordance with an embodiment of the present invention.

The accumulating unit 510 accumulates sampling data of a tag signal ASK-demodulated at a symbol duration, for example 20 samples in FIG. 6. Herein, the accumulating unit 510 performs dual accumulation by a difference of a half duration, that is, a first accumulation is followed by a second accumulation in a half duration, and outputs each result value to the early peak detecting unit 520 and the late peak detecting unit 530.

The early peak detecting unit 520 receives a value obtained from accumulation at each symbol duration from the accumulating unit 510, and detects a maximum value and a minimum value of the values obtained from the first accumulation in the symbol section. Then, the absolute values of the maximum value and the minimum value are compared with each other, and the position of the larger value is determined as an early peak position.

The late peak detecting unit 530 receives values of second accumulation which begins a half duration behind the first accumulation, finds out a maximum value and a minimum value among the inputted accumulation values, just as in the early peak detecting unit 520, compares the absolute values of the maximum value and the minimum value, and finally detects the position of a larger value as a late peak position.

The peak data comparing unit 540 determines whether peak information is effective edge information by comparing the early peak position with the late peak position. When the peak information is effective edge information, the edge information is stored in the edge position registering unit 550. To be specific, the peak data comparing unit 540 compares a first value obtained by subtracting the early peak position value from the size of one symbol duration, which is 20 samples in the case of FIG. 6, with a second value obtained by subtracting the late peak position value from the size of the one symbol duration, and determines whether the peak information is effective edge information by checking whether a difference between the first value and the second value is within a tolerable range. When the peak information is determined as effective edge information, the position information is stored in the edge position registering unit 550 to be used in tag signal synchronization in the correlator 370.

Meanwhile, when the timing lock module 365 generates a tag effective signal indicating that an effective tag signal is inputted, when the number of edge information stored in the edge position registering unit 550 is more than a predetermined number N. The tag effective signal can be referred to for determining whether to perform correlation by using previous edge information, when there is no edge information stored in the correlator 370. It can also be referred to for checking whether the tag information is effective in the CRC and message checker 244.

The correlator 370 performs one-bit correlation onto a tag signal demodulated in the digital ASK demodulating block 310 by using edge information detected in the edge information detector 360. Herein, the edge information stored in the edge position registering unit 550 is used for synchronization of tag signals. According to the ISO/IEC 18000-6C Specification, the correlator 370 performs correlation by using data-0 and data-1 of Miller-modulated sub-carrier or FM0. The bit data decider 380 receives a result vale of the correlation and decides bit data.

The preamble detector 390 combines patterns of tag symbols decoded in the correlator 370 and the bit data decider 380 and determines whether the patterns coincide with a preamble defined in the specification. It also checks the reception state of tag data by transmitting the result to the CRC and message checker 244 or the anti-collision state machine 220. The international standard ISO/IEC 1800-6C defines the specifications of an FM0 preamble and a Miller-sub-carrier preamble.

FIG. 6 is a view describing the operation of the decoding block 350 in accordance with an embodiment of the present invention. It is necessary to detect edge information of a tag signal to decode a demodulated tag signal. FIG. 6 shows a process of detecting edge information and synchronizing a tag signal when one symbol is composed of 20 samples. Also, the early peak detecting unit 520 and the late peak includes a counter for searching peak position information, and the correlator 370 includes a counter for synchronization of tag signals. Hereinafter, the operation of the decoder 246 will be described in accordance with an embodiment of the present invention with reference to FIG. 6.

As illustrated in FIG. 6, when a demodulated tag signal 600 is inputted, the accumulating unit 510 performs a first accumulation for detecting an early peak and a second accumulation for detecting a late peak onto the inputted tag signal at one symbol duration, and transmits the accumulation result values to the early peak detecting unit 520 and the late peak detecting unit 530 in real-time, respectively. The second accumulation 620 begins a half duration behind the first accumulation 610.

The early peak detecting unit 520 receives the accumulation values of one symbol duration from the accumulating unit 510 in real-time to detect an early peak, detects a maximum value and a minimum value in the duration, compares the absolute values of the two values, and transmits position information of a larger value to the peak data comparing unit 540. In FIG. 6, the position where the accumulation value is the minimum is the $5^{th}$ sample position Min (5) 612, and the position where the accumulation value is the maximum is the $15^{th}$ sample position Max (15) 613. Since the absolute value of the accumulation value at the Max (15) 613 is larger than that of the accumulation value at the Min (5) 612, the position information of the Max (15) 613 is transmitted to the peak data comparing unit 540.

Meanwhile, the late peak detecting unit 530 receives result values of the second accumulation which starts a half duration behind the first accumulation, detects a maximum value and a minimum value, compares the absolute values of the two values, and transmits position information of a larger value to the peak data comparing unit 540. In FIG. 6, the position where the accumulation value is the minimum is the $15^{th}$ sample position Min (15) 623, and the position where the accumulation value is the maximum is the $5^{th}$ sample position Max (5) 622. Since the absolute value of the Min (15) 623 is larger than that of the Max (5) 622, the position information of the Min (15) 623 is transmitted to the peak data comparing unit 540.

The peak data comparing unit 540 compares the early peak position information transmitted from the early peak detecting unit with the late peak position information transmitted from the late peak detecting unit, and determines whether position information is effective edge information. When the position information is effective edge information, the position information is stored in the edge position registering unit 630. To be specific, the peak data comparing unit 540 compares a first peak position '5' (=20-15) obtained by subtracting the early peak position Min (5) from the size of one symbol duration, i.e., 20 samples, with a second peak position '5' (=20-15) obtained by subtracting the late peak position Min (15) from the size of one symbol duration, i.e., 20 samples, and determines whether the difference between the first peak position and the second peak position is within a tolerable range. In FIG. 6, the early peak position and the late peak position are the same and their difference remains within the tolerable range. Thus, the peak position '5' is regarded as effective edge information and stored in the edge position registering unit 630. The edge position registering unit 630 may be realized in the form of a shift register, and it stores edge position detected in consecutive symbol durations.

The correlator 370 performs one-bit correlation onto a tag signal by using edge information stored in the edge position registering unit 630. To be specific, the correlator 370 begins one-bit correlation onto a tag signal at a position delayed by as long as the edge position stored in the edge position registering unit 630 from the late peak position (see 641 and 642). Also, the correlator 370 continues to perform the one-bit correlation delayed as long as a stored edge position from the next late peak position in the next duration. In FIG. 6, the correlator 370 initiates one-bit correlation for a tag signal at a position delayed by the edge position '5' detected and stored for the initial symbol duration at a position one and a half duration behind (30 samples) from a position where accumulation for an early peak detection starts, i.e., the initial late peak position (see 641 and 642). Then, the correlator 370 starts the next one-bit correlation at a position delayed by the next stored edge position '5' at the next late peak position (see 643).

When the comparison result of the peak data comparing unit 540 goes out of the tolerable range, the correlator 370 performs the one-bit correlation by using previous edge information. Particularly, when more than N edge information is stored in the edge position registering unit 630 and a tag effective signal is generated in the timing lock module, the correlator 370 performs one-bit correlation by using previous edge information already stored in the edge position registering unit 630 to thereby improve the reliability of tag data decoding.

Meanwhile, the bit data decider 380 decides symbol data based on the signal correlation result value, and the preamble detector 390 detects a preamble by combining patterns of the determined symbol data and determining whether the patterns coincide with the preamble defined in the specification. When the preambles of tag signal are successfully detected, the preamble detector 390 transfers tag data which are consecutively recovered to the CRC and message checker 244. When the CRC and message checker 244 successfully receives the tag data, it transfers the tag data including an Electronical Product Code (EPC) to the reader control unit 210 through the receiving message buffer 242. On the contrary, when the preamble detector 390 fails to detect a preamble of the tag signal, it stops decoding of the tag signal and notifies the CRC and message checker 244 or the anti-collision state machine 220 of the suspension in decoding. Then, the anti-collision state machine 220 executes subsequent reader commands.

The present invention provides a tag signal receiving apparatus for a mobile RFID reader that can perform digital Amplitude-Shift Keying (ASK) demodulation onto signals transmitted from a tag, decode the demodulated tag signals in synchronization, and acquire tag data in an MRF SoC for performing the function of the RFID reader mounted on a mobile device such as a wireless communication terminal, and a method thereof. Particularly, the present invention provides a digital tag signal receiving apparatus that can be easily mounted on the MRF SoC operated in the UHF band.

Also, the present invention can remove a amplitude variation of the backscattered tag signal caused by a phase change according to tag signal reading range by receiving an I channel tag signal and a Q channel tag signal, performing SQR conversion, and combining the result.

In addition, the present invention can improve reliability of tag data decoding and processing rate by effectively detecting edge information of a digital-ASK-demodulated tag signal and using the detected edge information for synchronization of tag signals.

The present application contains subject matter related to Korean patent application No. 2005-00912605 and No. 2006-0042575, filed with the Korean Intellectual Property Office on Sep. 29, 2005, and May 11, 2006, respectively. The entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A tag signal receiving apparatus for a Radio Frequency Identification (RFID) reader, comprising:
   a digital demodulating block for performing Amplitude Shift Keying (ASK) demodulation onto a digital tag signal received through a reader antenna and converted by an analog-to-digital (AD) converter; and
   a decoding block for detecting edge position information of the demodulated tag signal by performing accumulation and decoding the demodulated tag signal by using the detected edge position information.

2. The tag signal receiving apparatus as recited in claim 1, wherein the digital demodulating block includes a phase inverter for inverting a phase of a channel signal having a smaller signal level in an In-phase (I) channel tag signal and a Quadrature (Q) channel tag signal which are outputted from the AD converter; and
   summating means for summating the phase-inverted channel signal and the other channel signal having a larger signal value.

3. The tag signal receiving apparatus as recited in claim 1, wherein the digital demodulating block includes:
   a channel level comparator for comparing signal levels of the I and Q channel signals outputted from the AD converter;
   a phase inverter for inverting a phase of a channel tag signal having a smaller signal level in the I channel tag signal and the Q channel tag signal;
   a signal converter for squaring positive data and negative data of the phase-inverted tag signal and the channel tag signal having a larger signal level, and converting the squared value of negative data into a negative number; and
   summating means for summating the I channel tag signal and the Q channel tag signal which are outputted from the signal converter.

4. The tag signal receiving apparatus as recited in claim 3, wherein the channel level comparator includes:
   a multiplying unit for multiplying the I channel tag signal and the Q channel tag signal which are outputted from the AD converter;
   a Received Signal Strength Indication (RSSI) filtering unit for measuring RSSI of the squared I and Q channel tag signals; and
   an RSSI comparing unit for comparing the measured RSSI of the I and Q channel tag signals.

5. The tag signal receiving apparatus as recited in claim 1, wherein the decoding block includes:
   an edge information detector for detecting edge position information of the demodulated signal;
   a correlator for performing correlation onto the demodulated signal based on the detected edge position information; and
   a bit data decider for determining bit data based on the correlation result.

6. The tag signal receiving apparatus as recited in claim 5, wherein the correlator decides a position where correlation is to be performed for the demodulated tag signal based on the edge position information.

7. The tag signal receiving apparatus as recited in claim 5, wherein the edge information detector detects edge information of the demodulated tag signal based on a first peak position where an absolute value of a value obtained from a first accumulation for one symbol duration is a maximum and a second peak position where an absolute value of a value obtained from a second accumulation performed for a half duration behind the first accumulation is a maximum for one symbol duration.

8. The tag signal receiving apparatus as recited in claim 7, wherein the edge information detector includes:
   a first peak detecting unit for detecting the first peak position;
   a second peak detecting unit for detecting the second peak position; and
   an edge position registering unit for deciding and storing the edge position information for the demodulated signal, when a difference between the first peak position and the second peak position is within a tolerable range.

9. The tag signal receiving apparatus as recited in claim 5, wherein the correlator performs the correlation by using a FM0 (bi-phase space encoding).

10. The tag signal receiving apparatus as recited in claim 5, wherein the correlator performs the correlation by using a Miller-modulated sub-carrier symbol.

11. The tag signal receiving apparatus as recited in claim 8, wherein the decoding block further includes a tag effective signal generator for generating a tag effective signal, when the number of edge position information stored in the edge position registering unit is larger than a predetermined number.

12. The tag signal receiving apparatus as recited in claim 11, wherein the correlator decides whether to perform correlation based on the tag effective signal.

13. The tag signal receiving apparatus as recited in claim 5, wherein the decoding block further includes a preamble detector for detecting a preamble from bit data decided in the bit data decider.

14. The tag signal receiving apparatus as recited in claim 13, wherein the preamble detector detects an FM0 preamble.

15. The tag signal receiving apparatus as recited in claim 13, wherein the preamble detector detects a Miller-modulated sub-carrier preamble.

16. A tag signal receiving method for an RFID reader, comprising the steps of:
   a) converting a tag signal received through a reader antenna into a digital tag signal;
   b) performing digital Amplitude Shift Keying (ASK) demodulation onto the digital tag signal;
   c) detecting edge position information of the demodulated tag signal;

d) decoding the demodulated tag signal based on the detected edge position information; and e) detecting a preamble from the decoded tag data.

17. The tag signal receiving method as recited in claim 16, wherein the digital tag signal includes an In-phase (I) channel tag signal and a Quadrature (Q) channel tag signal.

18. The tag signal receiving method as recited in claim 17, wherein the demodulation step b) includes the steps of:

b1) measuring and comparing Received Signal Strength Indication (RSSI) of the I channel tag signal and the Q channel tag signal with each other;

b2) inverting a phase of a channel tag signal having a smaller RSSI;

b3) performing Square Root (SQR) signal conversion onto the phase-inverted channel tag signal and a channel tag signal having a larger RSSI by squaring positive data and squaring negative data and converting the squared negative data into a negative number; and b4) summating the SQR-converted I channel tag signal and the SQR-converted Q channel tag signal.

19. The tag signal receiving method as recited in claim 16, wherein the edge position information detection step c) includes the steps of:

c1) detecting a first peak position from a first accumulation performed onto the demodulated tag signal for one symbol duration;

c2) detecting a second peak position from a second accumulation performed a half symbol duration behind the first accumulation for one symbol duration; and c3) detecting and storing edge position information based on the first peak position and the second peak position.

20. The tag signal receiving method as recited in claim 19, wherein the edge position information detection step c) further includes the step of:

c4) generating a tag effective signal when the number of detected and stored edge position information is larger than a predetermined number.

21. The tag signal receiving method as recited in claim 20, wherein whether to decode the demodulated tag signal is determined based on the tag effective signal in the decoding step d).

22. The tag signal receiving method as recited in claim 16, wherein the decoding step d) includes the steps of:

d1) performing correlation onto the demodulated tag signal based on the detected edge position information; and d2) deciding bit data based on correlation result.

23. The tag signal receiving method as recited in claim 22, wherein a position where the correlation is to be performed onto the demodulated tag signal is decided based on the edge position information in the correlation step d1).

24. The tag signal receiving method as recited in claim 22, wherein the correlation is performed based on a FM0 (biphase space encoding) symbol in the correlation step d1).

25. The tag signal receiving method as recited in claim 22, wherein the correlation is performed based on a Miller-modulated sub-carrier symbol in the correlation step d1).

26. The tag signal receiving method as recited in claim 16, wherein when a preamble is not detected in the preamble detection step e), the decoding of the demodulated tag signal is suspended.

27. The tag signal receiving method as recited in claim 16, wherein an FM0 preamble is detected in the preamble detection step e).

28. The tag signal receiving method as recited in claim 16, wherein a Miller-modulated sub-carrier preamble is detected in the preamble detection step e).

29. A Radio Frequency Identification (RFID) reader mounted on a wireless communication terminal, comprising:

a digital demodulating block for performing Amplitude Shift Keying (ASK) demodulation onto a digital tag signal received through a reader antenna and converted by an analog-to-digital (AD) converter;

a decoding block for detecting edge position information of the demodulated signal and decoding the demodulated signal based on the detected edge position information; and a reader control unit for acquiring tag data from the decoded tag signal and transferring the tag data to the wireless communication terminal.

30. The RFID reader as recited in claim 29, wherein the digital demodulating block includes a Received Signal Strength Indication (RSSI) filtering unit for measuring RSSI of an In-phase (I) channel tag signal and a Quadrature (Q) channel tag signal which are outputted from the AD converter.

31. The RFID reader as recited in claim 30, wherein the digital demodulating block further includes an LBT controller for deciding a channel to be used for communication with a tag by using the RSSI measured in the RSSI filtering unit.

32. The RFID reader as recited in claim 30, wherein the digital demodulating block includes:

a phase inverter for inverting a phase of a channel tag signal having a smaller signal level in the I channel tag signal and the Q channel tag signal based on the measurement result in the RSSI filtering unit;

an Square Root (SQR) signal converter for performing SQR signal conversion onto the phase-inverted channel tag signal and a channel tag signal having a larger signal level than the phase-inverted channel tag signal; and summating means for summating the SQR-converted I channel tag signal and the SQR-converted Q channel tag signal.

33. The RFID reader as recited in claim 29, wherein the decoding block includes:

an edge information detector for detecting edge position information of the demodulated signal;

a correlator for performing correlation onto the demodulated signal based on the detected edge position information; and a bit data decider for deciding bit data based on the correlation result.

34. The RFID reader as recited in claim 33, wherein the decoding block further includes:

a tag effective signal generator for generating a tag effective signal, when the number of edge position information detected in the edge information detector is larger than a predetermined number.

35. The RFID reader as recited in claim 33, wherein the decoding block further includes:

a preamble detector for detecting a preamble from bit data decided in the bit data decider.

36. The RFID reader as recited in claim 33, wherein the edge information detector further includes:

a first peak detecting unit for detecting a first peak position based on a first accumulation performed onto the demodulated tag signal for one symbol duration;

a second peak detecting unit for detecting a second peak position based on a second accumulation performed a half duration behind the first accumulation; and an edge position registering unit for deciding and storing edge position information for the demodulated signal, when a difference between the first peak position and the second peak position is within a tolerable range.

37. The RFID reader as recited in claim 33, wherein the correlator decides a position where correlation is to be performed onto the demodulated tag signal based on the edge position information.

38. The RFID reader as recited in claim 34, wherein the correlator decides whether to perform the correlation based on the tag effective signal.

* * * * *